United States Patent
Hedley

(10) Patent No.: US 6,187,245 B1
(45) Date of Patent: Feb. 13, 2001

(54) MANUFACTURE OF MAT WITH THICKENED PERIPHERAL EDGES

(75) Inventor: Terence Michael Hedley, Bedfordshire (GB)

(73) Assignee: Walk Off Mats Limited, Bedfordshire (GB)

(*) Notice: Under 35 U.S.C. 154(b), the term of this patent shall be extended for 0 days.

(21) Appl. No.: 09/029,402

(22) PCT Filed: Aug. 27, 1996

(86) PCT No.: PCT/GB96/02105

§ 371 Date: Feb. 26, 1999

§ 102(e) Date: Feb. 26, 1999

(87) PCT Pub. No.: WO97/09159

PCT Pub. Date: Mar. 13, 1997

(30) Foreign Application Priority Data

Sep. 1, 1995 (GB) .................................... 9517921

(51) Int. Cl.[7] .................................... B29C 65/02
(52) U.S. Cl. .................... 264/314; 428/88; 156/228; 156/285
(58) Field of Search ............... 428/88; 264/314; 156/228, 285, 242, 273.3, 273.5

(56) References Cited

U.S. PATENT DOCUMENTS

| 3,382,125 | 5/1968 | Lowdermilk, Jr. | 156/214 |
| 4,435,451 | * 3/1984 | Neubert | 428/15 |
| 4,447,201 | * 5/1984 | Knudsen | 425/397 |
| 5,061,430 | 10/1991 | Lang | 264/316 |

FOREIGN PATENT DOCUMENTS

| 0007321 A1 | 2/1980 | (EP) . |
| 0351041 A3 | 5/1989 | (EP) . |
| 367 441 A2 * | 5/1990 | (EP) . |
| 0513449 A1 | 5/1991 | (EP) . |
| 2275869 | 9/1994 | (GB) . |

* cited by examiner

Primary Examiner—Terrel Morris
Assistant Examiner—Cheryl Juska
(74) Attorney, Agent, or Firm—Fay, Sharpe, Fagan, Minnich & McKee, LLP

(57) ABSTRACT

The invention provides a process for making a mat particularly a washable dust control mat, having a fabric layer (2) and a rubber backing layer (4) with a border (6) extending beyond the fabric layer (2) using a press which heat-cures the rubber and adheres it to the fabric and employs an inflatable bag (24) to apply pressure by pressing the layers against a heated platen (21), wherein a frame (14) defining the extent of the border (6) is located between the bag and the platen, and wherein the bag applies pressure to the assembled layers including the border portion of the backing layer. The frame (14) can act as a dam for preventing outward movement of the rubber and provide an integral thickened border; in some cases it also provides a guillotine for trimming the rubber during pressing.

37 Claims, 1 Drawing Sheet

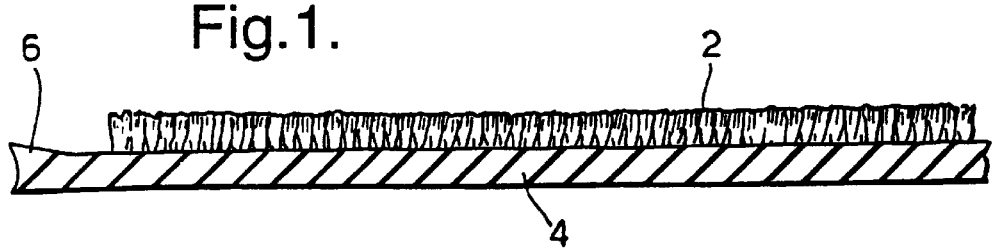
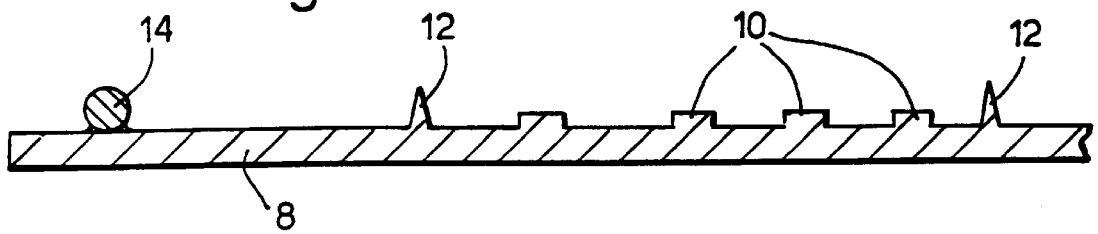
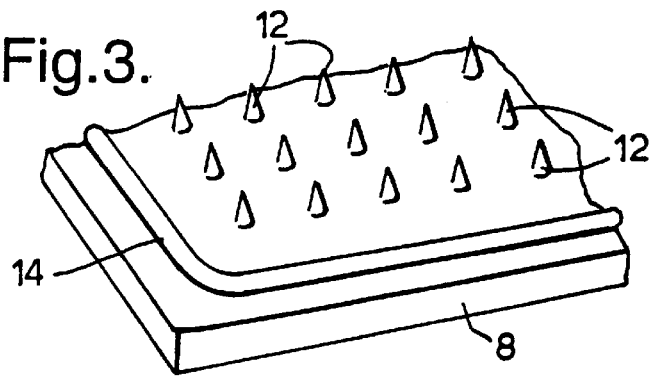
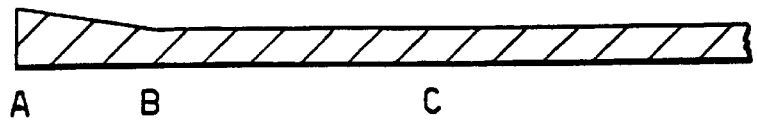
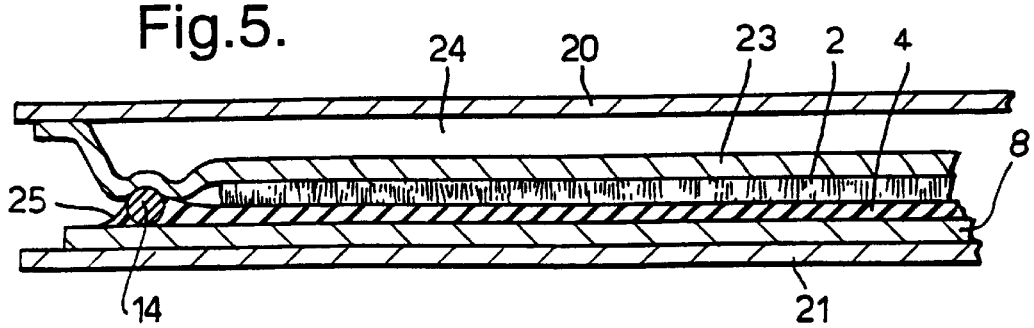

MANUFACTURE OF MAT WITH THICKENED PERIPHERAL EDGES

BACKGROUND OF THE INVENTION

This invention relates to the manufacture of mats, rugs and carpets, particularly mats, rugs and carpets where a rubber (natural or synthetic) backing sheet is cured and heat-bonded under pressure to the back of a fabric layer leaving a rubber border extending beyond the fabric layer. It also relates to mats, rugs and carpets as such and to apparatus for use in producing them.

The invention is of particular utility in the manufacture of washable mats, rugs and carpets such as dust-control mats. The term "washable" means washable by immersion and agitation in water or other cleaning fluid usually followed by spin extraction and tumble drying. The term "mat" is used hereinafter in a wide sense to include rugs and carpets.

Dust control mats have conventionally been made by first laying down an uncured sheet of rubber, placing a mat fabric layer on top of it leaving the required border (e.g. 2 cm), and placing the assembly of the two layers in a heated press which cures the rubber and bonds it to the fabric. The layers are conveniently assembled on a horizontally movable carrier which can be moved into and out of the press on rollers, the carrier having an upper layer of flexible material secured around its edges to form an inflatable bag. Once in the press the carrier can be raised with hydraulic or pneumatic rams beyond a point where support blocks can be moved horizontally beneath the carrier (so that the rams do not sustain the pressing force). The bag is then inflated to press the mat assembly against a heated platen disposed above it and heated to say 170° C. by pressurised steam in conduits in the platen. The advantage of applying pressure using a bag is that a bag conforms to the contour of the mat assembly and applies an even pressure. After curing the pressurised air in the bag is released and the bag evacuated by applying suction or using the hydraulic or pneumatic rams to squeeze the air out. The support blocks are removed and the rams lower the carrier so that it can be removed from the press.

This arrangement is generally preferred as the operator can easily locate the fabric layer on the backing layer when the fabric layer is on top and it is desirable to apply the heat from the fabric side so as to ensure proper bonding of the two layers so that they do not separate in use. However it is possible to reverse the arrangement so that heat is applied to the rubber side and/or the fabric layer is beneath the rubber layer. Also, if the range of movement of the bag surface is sufficient, it is possible to omit the rams and the blocks because the assembly is sufficiently close to the heated platen when it enters the press.

It is conventional to provide release sheets of non-stick material such as polytetrafluoroethylene or silicone materials between the fabric layer and the platen and between the bag and the rubber. It is also conventional to provide a light aluminum (or other metal) moulding sheet in contact with the rubber, the moulding sheet having holes or depressions which mould projections (cleats) or patterns (e.g. logos) into the rubber. Silicone rubber moulding sheets can also be used.

The rubber flows outwardly during pressing to form edges which taper down to a very small thinness. These edges are prone to tearing and extend by unpredictable distances. Hence it is necessary in practice to trim the cured backing sheet with guillotines or knives. Finally it is conventional to provide small openings in the rubber backing to allow passage of water during laundering, particularly during spin extraction. This can be achieved by running the mats between a spiked roller and a backing roller having grooves aligned with the spikes.

The three steps of (a) assembling the layers and operating the press, (b) trimming the edges of the backing, and (c) piercing the backing, are labour-intensive and we have sought ways of improving the efficiency of the overall process.

BRIEF SUMMARY OF THE INVENTION

According to the invention, we provide a process for making a mat (preferably a dust control mat) having a fabric layer and a rubber backing layer using a press which heat-cures the rubber and adheres it to the fabric and employs an inflatable bag to apply pressure by pressing the layers against a heated platen, wherein a frame defining the extent of the periphery of the mat is located between the bag and the platen and wherein the bag applies pressure over substantially the whole area of the backing layer.

According to a preferred embodiment of the invention, we provide a process for making a mat (preferably a dust control mat) having a fabric layer and a rubber backing layer with a border extending beyond the fabric layer using a press which heat-cures the rubber and adheres it to the fabric and employs an inflatable bag to apply pressure by pressing the layers against a heated platen, wherein a frame defining the extent of the border is located between the bag and the platen, and wherein the bag applies pressure to the assembled layers including the border portion of the backing layer. A border beyond the fabric layer is normally provided but the invention is operable without any border or with a very small border e.g. 1–2 mm wide if the frame cannot cut through the fabric layer; for convenience only, the following description refers to mats with borders.

Preferably, rubber accumulates in the areas immediately inward of the frame while it is still flowable such that a thickened reinforcement is provided in these areas of the cured backing layer. Thus, according to another aspect of the invention, we provide a mat in which a rubber backing sheet has an integral thickened peripheral region.

Preferably the bag applies pressure to the fabric side of the assembled layers although the alternative arrangement where it applies pressure to the backing side can be used.

The press may take a number of forms e.g. as described in U.S. Pat. No. 4,447,201 to Knudsen, the contents of which are incorporated herein by reference.

This patent describes the more common movable frame type of press. However, fixed frame presses such as that described in EP-A-367441 may be used. A number of presses suitable for making dust control mats are commercially available from Shaw-Almex USA Inc. of 3529-H Church Street, Clarkston, Ga. 30021, USA.

The frame is normally of metal and in one preferred arrangement, can for example be part of (formed e.g. by machining, moulding or casting) or connected to (e.g. adhered to or welded to) the moulding sheet referred to above. Thus, according to a further aspect of the invention, we provide a moulding sheet for use in making mats by heat-compression moulding an assembly of a rubber backing layer and a fabric layer, the sheet comprising or being associated with a frame defining the mat periphery.

The frame can be greater or smaller in area than the initial area of the backing layer. If it is greater in area than the initial area of the backing layer it acts as a dam; if it is smaller it acts both as a guillotine and a dam. The latter arrangement is preferred in which case the frame needs to have a cross-section which is narrow at the top or bottom to provide a cutting action.

In order that the operator can ensure that the border is in the correct position, another preferred arrangement is for the fabric layer and for the frame (which in this case is separate from the moulding sheet) to be both placed on top of the backing layer such that in the press the bag bears down on both the fabric layer and the frame, the latter being forced downwardly through the backing layer.

It is preferred to make the frame of metal rod, particularly of circular section with the section diameter being preferably about twice the backing layer thickness in the central part of the finished mat. If the diameter (height) is too small, the thickened rubber layer in the border may be too thin; if it is too great, the inherent stiffness of the bag material may prevent adequate compression in the angle between the frame and the top of the backing layer. A circular section rod may provide a concave end to the border but this has been found not to be a disadvantage. A circular section rod of appropriate diameter is sharp enough to be pushed through the rubber, during initial operation of the press, while being blunt enough to avoid damage to the bag.

Normally the finished mat will be rectangular and a rectangular frame will be used. However, other shapes such as circular or rectangular with rounded corners can be used. Also, the sides of the frame will not necessarily be joined together but this will normally be the case so that unwanted movement during pressing is avoided. Thus the frame may be interrupted and define only part of the mat periphery e.g. one or more sides of the frame may be omitted.

It will be seen that the process described eliminates a subsequent trimming operation since any excess rubber outside the frame can be peeled away after pressing. It is also possible, according to a preferred feature of the invention, to simultaneously pierce the backing to provide the small holes described above. This can be achieved for example by providing spikes on the moulding sheet referred to above. The spikes need not necessarily pass completely through the backing since a thin membrane at the end of the hole which they provide will be broken during subsequent use of the mat. The moulding sheet may be shaped to provide dish-like depressions around the holes as described in our GB patent application GB-A-2275869.

As mentioned above, a further advantage of the invention arises from accumulation of rubber in the border area where the maximum strength of the backing layer is required. This means that the thickness over the main area of the mat can be reduced e.g. from 2 mm to 1 mm because the accumulation in the border area can double the thickness. This of course means that the amount of rubber used is substantially reduced. Also the use of a frame reduces wastage simply because there is no longer a substantial tapered peripheral area of backing layer which has to be trimmed off to achieve the desired edge thickness.

Instead of using a greater overall thickness to achieve the required border thickness, some previous mats have a reinforced border made by heat fusing an extra layer of rubber thereto. This is labour-intensive and can lead to rippling due to differential shrinkage of the two rubbers during laundering. The present invention can be used to overcome these disadvantages.

BRIEF DESCRIPTION OF THE DRAWINGS

Preferred embodiments of the invention will now be described in more detail, reference being made to the drawings in which:

FIG. 1 is a vertical section through a dust control mat made according to the invention;

FIG. 2 is a vertical section through part of a moulding sheet to which a frame is secured;

FIG. 3 is a view from above of the moulding sheet shown in FIG. 2 (omitting the projections);

FIG. 4 is a more diagrammatic sectional view of an edge of a mat showing the positions of the dimensions given in the Table below; and FIG. 5 is a diagrammatic vertical section of a mat-making press of the type which can be used in the process of the invention.

DETAILED DESCRIPTION OF THE INVENTION

The mat shown in FIG. 1 has a pile fabric 2 and a rubber backing 4 with a thicker border 6 extending beyond the fabric 2. The moulding sheet 8 shown in FIG. 2 and FIG. 3 is basically of a conventional type with projections 10 which form indentations in the backing 4 and thus provide cleats or a pattern or logo, but additionally having spikes 12 for perforating the backing 4 and a frame 14 of generally rectangular shape but with rounded corners. The frame 14 in this case is a complete uninterrupted frame and is made of circular section metal (i.e. steel) rod and is secured to the sheet 8 (e.g. by welding). In another embodiment, the sheet 8 has perforations for forming the cleats (instead of projections 10). If it is desirable that cleats are not formed in certain areas, e.g. adjacent the edge of the mat, the relevant perforations may be blanked off with an adhesive backed PTFE coated woven glass fabric.

The fabric layer can be of a tufted pile, cut, looped or both, and is typically of cut pile. The pile is generally of synthetic fibre such as polyamide, polyester or polypropylene or of natural fibre such as cotton or viscose. With a tufted pile a typical weight is of between 300 and 1200 gms/m$^2$ particularly 640 gms/m$^2$; in one preferred example we use Polyamide (Nylon 6) with a tufted pile weight of 640 gms/m$^2$. The pile can be tufted onto a woven or non-woven substrate (primary backing) e.g. of polyester or polypropylene of density between 70 and 300 gms/m$^2$. In the preferred example we use a non-woven polyester primary backing of density 100 gms/m$^2$.

Dependent on mat size and width of border required the fabric size will vary but for a typical mat with 2 cms borders the fabric would be 3 cms smaller than the finished mat size e.g. for a mat of finished dimension 120×80 cms the fabric used would be 117×77 cms. This is because of shrinkage of around 1% which will reduce the 117 to 116 cms. As discussed above the border can be virtually non-existent but this is not preferred.

Although a wide variety of natural or synthetic rubbers can be used, the backing layer is preferably a nitrile (Acrylonitrile Butadiene Rubber) or SBR (Styrene Butadiene Rubber) or blend thereof, of hardness between 35 and 75 IRHD and thickness of between 0.5 and 3 mm. In the preferred example a 100% nitrile rubber of hardness 60 IRHD and thickness of 1.01 mm is used.

The frame size may for example be 1 cm in all directions larger than the finished mat. For example to produce a 120×80 cms mat will require a frame with dimensions 121×81 cms. This is to allow for shrinkage (again around 1%) of the mat on cooling after vulcanisation.

The initial and final thickness are dependent on the cross-sectional diameter of the frame members and pressure used during manufacture of the mat. Referring to FIG. 4 of the drawings, the following dimensions are typical:

| Rubber Thickness | Frame Diameter | Backing Pressure | Thickness at A | Thickness at B | Thickness at C |
|---|---|---|---|---|---|
| 1.52 mm | 3 mm | 30 psi | 1.72 mm | 1.71 mm | 1.58 mm |
| 1.52 mm | 3 mm | 40 psi | 2.38 mm | 1.67 mm | 1.57 mm |
| 1.52 mm | 3 mm | 50 psi | 2.44 mm | 1.79 mm | 1.55 mm |
| 1.01 mm | 2 mm | 30 psi | 1.39 mm | 1.19 mm | 1.03 mm |
| 1.01 mm | 2 mm | 50 psi | 1.53 mm | 1.19 mm | 1.07 mm |

In the preferred example we use 1.01 mm thickness rubber at 30 psi with a 2 mm diameter frame members to produce the results above.

Again in the preferred example we use the bag on top, platen beneath method (with the fabric layer on top of the backing layer which facilitates accurate placing of the fabric layer).

An arrangement with the bag below (adjacent the backing layer) and the platen above can be used but in such a case the moulding sheet for the backing layer cannot be a rigid metal sheet as such a sheet would prevent compression of the border due to the greater thickness of the main part of the mat. In such a case a flexible moulding sheet e.g. of silicone rubber could be used to produce the cleats and openings referred to above.

At 170° C. for example cure times could vary between 3 and 25 minutes dependent on rubber formulation and whether the platen is above or below. In the preferred example with the platen below and using 1.01 mm thick rubber the cure time was 5 minutes. It may be desirable to reduce the temperature or modify the rubber formulation to give an increased cure time. This will give a longer flow time which will improve the cross-section of the border and give better tuft anchorage as well as permitting a reduction in pressure.

A typical moulding sheet is of 1.6 mm thick aluminium sheet with 2 mm diameter holes on a 5 mm square pitch. The spikes may for example be in rows 10 cms apart with 5 cms between rows and with spikes in the next row on a staggered pitch.

Generally the vacuum generated by a domestic vacuum cleaner is sufficient for evacuating the air bag; this is around 75 inches of water.

The temperature of the platen may for example be 165 175° C. (constant), 170° C. being preferred. The preferred pressure is 30 psi.

The frame will normally be below the backing sheet and permanently fixed e.g. by welding to the base plate (or release sheet) to ensure squareness. As indicated above it is preferably of circular section metal rod welded to form the desired mat shape e.g. rectangular.

Referring now to FIG. 5, there is shown diagrammatically and not to scale, a peripheral part of a press of the general type disclosed in U.S. Pat. No. 4,447,201 together with a mat and frame arrangement according to the present invention. The press has an upper frame member 20 which may or may not be movable towards and away from a heated platen 21 for loading and unloading. Secured by its edges to the upper frame member 20 is a flexible diaphragm 23 which, together with the frame member 20 forms an air bag 24. Air can be supplied under pressure to the bag 24 to move the diaphragm 23 downwards for pressing and can be exhausted by a vacuum arrangement to raise the diaphragm 23. The mat backing 4, the pile fabric 2 and the base plate 8 and frame 14 are as shown in FIGS. 1–3, except that the provision for forming cleats etc. is omitted for simplicity. As shown the pressing operation is completed and the frame 14 has cut off a peripheral part of the backing shown at 25.

EXAMPLE

A dust control mat as shown in FIG. 1 has a backing layer of cured 100% nitrile rubber of hardness 60 IRHD, thickness 1.01 mm (over the main part of its area), and overall dimensions 120×80 cm. Bonded thereto is a fabric layer of dimensions 116×76 cm leaving a 2 cm peripheral border. The fabric layer comprises a tufted pile of Nylon 6 with a tufted pile weight of 640 gms/m$^2$ tufted onto a non-woven polyester substrate of density 100 gms/m$^2$. The mat is made as follows.

The layers are assembled with the fabric layer on top and heat- and pressure-cured in a press with heated platen beneath and an air bag on top e.g. as described and shown in FIG. 1 of U.S. Pat. No. 4,447,201. The layers are carried on a moulding sheet of 1.6 mm thick aluminium which can be rolled into and out of the press on rollers. When in the press, it is located over the heated platen such that heat can readily pass through it when the pressure is applied by the air bag. The moulding sheet is as shown in FIGS. 2 and 3 (but with a separate frame) and has 2 mm diameter holes on a 5 mm square pitch to provide projections (cleats) in the backing in the usual way. Spikes are provided in rows 10 cm apart with 5 cm between rows and spikes in adjacent rows being on a staggered pitch. These spikes provide holes in the backing layer to facilitate laundering. The frame is a 121×81 cm rectangular frame made up of 2 mm diameter steel rod and in this case is hand-positioned on top of the backing layer border before entry into the press. Release sheets of conventional type are provided as described above. The air bag is inflated at 30 psi for 5 minutes and then evacuated, the temperature of the platen being maintained at a constant 170° C. The cured mat is then withdrawn on the aluminium sheet.

The initial size of the backing layer is approximately 123×83 cms such that the frame acts as a guillotine as well as a dam. The excess rubber beyond the frame can be peeled away prior to the next cycle and a mat with a thickened border is obtained as indicated in the above table.

What is claimed is:

1. A process for making a mat having a fabric layer and a rubber backing layer using a press having an inflatable bag, a heated platen, and a frame defining the extent of the periphery of the mat located between the bag and the platen, the process comprising the steps of:

placing a fabric layer and an uncured rubber backing layer in the press between the inflatable bag and the heated platen; and, inflating the bag to press the fabric and uncured rubber backing layers against the heated platen by applying a pressure over substantially the whole area of the backing layer, to heat-cure the rubber layer and adhere it to the fabric layer, wherein the height of the frame is greater than the thickness of the uncured rubber backing layer, so that the rubber backing layer, when cured and adhered to the fabric layer in a finished mat, has an integral thickened peripheral portion.

2. A process according to claim 1 wherein the mat is a dust control mat.

3. A process according to claim 2 wherein the mat is washable.

4. A process according to claim 1 wherein the bag applies pressure to the fabric side of the mat and the platen supplies heat to the backing side of the mat.

5. A process according to claim 1 wherein the fabric layer is on top of the backing layer during pressing.

6. A process according to claim 5 wherein the frame is placed on top of a border portion of the backing layer before pressing and it cuts through the backing layer during pressing.

7. A process according to claim 1 wherein the frame is on the side of the backing layer opposite to the fabric layer.

8. A process according to claim 7 wherein the frame is supported by a moulding sheet for forming cleats or patterns in the backing layer.

9. A process according to claim 8 wherein the frame is secured to or integral with the moulding sheet.

10. A process according to claim 8 wherein the moulding sheet is of metal.

11. A process according to claim 8 wherein the moulding sheet has spikes to provide holes in the backing layer.

12. A process according to claim 7 wherein the frame cuts through the backing layer during pressing.

13. A process according to claim 1 wherein the frame is substantially uninterrupted.

14. A process according to claim 1 wherein the frame is substantially rectangular.

15. A process according to claim 14 wherein the frame has rounded corners.

16. A process according to claim 1 wherein the frame is formed from circular section metal rod.

17. A process according to claim 1, wherein the backing layer flows outwardly during pressing and the frame acts as a dam so that the backing layer in the finished mat has an integral thickened peripheral portion.

18. A process according to claim 1 wherein the height of said frame is approximately twice the thickness of the uncured rubber backing layer.

19. A process for making a mat having a fabric layer and a rubber backing layer with a border extending beyond the fabric layer using a press having an inflatable bag, a heated platen and a frame defining the extent of the border located between the bag and the platen, the process comprising the steps of:
   placing a fabric layer and an uncured rubber backing layer in the press between the inflatable bag and the heated platen; and,
   inflating the bag to press the layers against the heated platen by applying a pressure to the assembled layers including the border portion of the backing layer, to heat-cure the rubber layer and adhere it to the fabric layer, wherein the height of the frame is greater than the thickness of the uncured rubber backing layer, so that the backing layer, when cured and adhered to the fabric layer in a finished mat, has an integral thickened peripheral portion.

20. A process according to claim 19 wherein the mat is a dust control mat.

21. A process according to claim 20 wherein the mat is washable.

22. A process according to claim 19 wherein the bag applies pressure to the fabric side of the mat and the platen supplies heat to the backing side of the mat.

23. A process according to claim 19 wherein the fabric layer is on top of the backing layer during pressing.

24. A process according to claim 23 wherein the frame is placed on top of a border portion of the backing layer before pressing and it cuts through the backing layer during pressing.

25. A process according to claim 19 wherein the frame is on the side of the backing layer opposite to the fabric layer.

26. A process according to claim 25 wherein the frame is supported by a moulding sheet for forming cleats or patterns in the backing layer.

27. A process according to claim 26 wherein the frame is secured to or integral with the moulding sheet.

28. A process according to claim 26 wherein the moulding sheet is formed of metal.

29. A process according to claim 26 further including providing the moulding sheet with spikes to provide holes in the backing layer.

30. A process according to claim 25 wherein the frame cuts through the backing layer during pressing.

31. A process according to claim 19 wherein the frame is formed substantially uninterrupted.

32. A process according to claim 19 wherein the frame is formed substantially rectangular.

33. A process according to claim 32 wherein the frame is formed having rounded corners.

34. A process according to claim 19 wherein the frame is formed from circular section metal rod.

35. A process according to claim 19, wherein the backing layer flows outwardly during pressing and the frame acts as a dam so that the backing layer in the finished mat has an integral thickened peripheral portion.

36. A process according to claim 19 wherein the height of said frame is approximately twice the thickness of the uncured rubber backing layer.

37. A process for making a mat comprising:
   placing a fabric layer and an adjacent uncured rubber backing layer in a press together with a frame;
   applying heat and pressure to at least one of said fabric and uncured rubber backing layers so that said rubber backing layer: (i) adheres to said fabric layer; and, (ii) flows outwardly from a central portion of said rubber backing layer toward a peripheral portion of said rubber backing layer, whereby said frame limits outward movement of said flowable rubber backing layer and flowable rubber of said backing layer accumulates adjacent said frame and forms an integral peripheral border of said rubber backing layer that has a thickness greater than a thickness of said central portion of said rubber backing layer; and,
   maintaining said heat applied to said rubber backing layer until said rubber backing layer is cured.

* * * * *